(12) United States Patent
Kwak et al.

(10) Patent No.: US 11,401,945 B2
(45) Date of Patent: Aug. 2, 2022

(54) COMPRESSOR BLADE ASSEMBLY STRUCTURE, GAS TURBINE HAVING SAME, AND COMPRESSOR BLADE ASSEMBLY METHOD

(71) Applicant: DOOSAN ENERBILITY CO., LTD., Changwon-si (KR)

(72) Inventors: Joo Hwan Kwak, Changwon (KR); Iurii Goroshchak, Gimhae (KR)

( * ) Notice: Subject to any disclaimer, the term of this patent is extended or adjusted under 35 U.S.C. 154(b) by 0 days.

(21) Appl. No.: 17/359,572

(22) Filed: Jun. 27, 2021

(65) Prior Publication Data
US 2022/0056922 A1    Feb. 24, 2022

(30) Foreign Application Priority Data

Aug. 19, 2020    (KR) .................. 10-2020-0103850

(51) Int. Cl.
    *F04D 29/34*      (2006.01)
    *F02C 3/04*       (2006.01)

(52) U.S. Cl.
    CPC .............. *F04D 29/34* (2013.01); *F02C 3/04* (2013.01); *F05D 2220/32* (2013.01); *F05D 2230/60* (2013.01)

(58) Field of Classification Search
    CPC .......... F04D 29/34; F01D 5/3007; F01D 5/16; F02C 3/04; F05D 2220/32; F05D 2230/60
    See application file for complete search history.

(56) References Cited

U.S. PATENT DOCUMENTS

| | | | | |
|---|---|---|---|---|
| 2,643,853 | A * | 6/1953 | Redding | ............... F01D 5/3007 29/451 |
| 5,522,702 | A * | 6/1996 | Kemsley | ................. F01D 5/326 416/221 |
| 6,109,877 | A * | 8/2000 | Gekht | ..................... F01D 5/323 416/207 |
| 6,837,686 | B2 * | 1/2005 | Di Paola | ................. F01D 5/323 416/248 |
| 8,157,530 | B2 | 4/2012 | Kritzfeldt | |
| 8,267,664 | B2 | 9/2012 | Tipton | |
| 8,562,301 | B2 * | 10/2013 | Jan | ......................... F01D 5/323 29/889.1 |
| 9,739,160 | B2 | 8/2017 | Kain | |
| 9,970,297 | B2 * | 5/2018 | Vest | ........................ C25D 1/02 |
| 10,400,784 | B2 | 9/2019 | Drozdenko | |

(Continued)

FOREIGN PATENT DOCUMENTS

| | | |
|---|---|---|
| CN | 111472845 A | 7/2020 |
| EP | 1643082 A1 | 4/2006 |

(Continued)

OTHER PUBLICATIONS

KR OA dated Nov. 22, 2021.

*Primary Examiner* — Jesse S Bogue
(74) *Attorney, Agent, or Firm* — Harvest IP Law, LLP (57) ABSTRACT

A compressor blade assembly structure, a gas turbine having the same, and a method of assembling compressor blade are provided. The compressor blade assembly structure includes a compressor blade having an airfoil, a platform part, and a dovetail part, a compressor rotor disk having a dovetail slot into which the dovetail part is inserted, and a locking key mounted in a key slot formed in the dovetail slot to support the compressor blade in an axial direction.

11 Claims, 11 Drawing Sheets

(56) References Cited

U.S. PATENT DOCUMENTS

| | | | | |
|---|---|---|---|---|
| 2013/0101422 A1* | 4/2013 | Bullinger | .................. | F01D 5/30 |
| | | | | 29/889.21 |
| 2015/0110635 A1* | 4/2015 | Kain | .................... | F01D 5/3007 |
| | | | | 416/221 |
| 2016/0265370 A1* | 9/2016 | Benson | .................... | F01D 5/323 |
| 2018/0058469 A1* | 3/2018 | Pope | ....................... | F04D 29/34 |
| 2019/0226347 A1* | 7/2019 | Kwak | .................... | F01D 5/3038 |

FOREIGN PATENT DOCUMENTS

| | | | |
|---|---|---|---|
| JP | 60192201 | U | 12/1985 |
| JP | 07166804 | A | 6/1995 |
| JP | 2002530580 | A | 9/2002 |
| JP | 4657482 | B2 | 3/2011 |
| JP | 5425919 | B2 | 2/2014 |
| JP | 5699131 | B2 | 4/2015 |
| JP | 6732953 | B2 | 7/2020 |
| KR | 100779289 | B1 | 6/2003 |
| KR | 20180105890 | A | 10/2018 |
| KR | 101919228 | B1 | 11/2018 |
| KR | 102040960 | B1 | 11/2019 |

\* cited by examiner

COMPRESSOR BLADE ASSEMBLY STRUCTURE, GAS TURBINE HAVING SAME, AND COMPRESSOR BLADE ASSEMBLY METHOD

CROSS REFERENCE TO RELATED APPLICATION

This application claims priority to Korean Patent Application No. 10-2020-0103850, filed on Aug. 19, 2020, the disclosure of which is incorporated herein by reference in its entirety.

BACKGROUND

1. Field

Apparatuses and methods consistent with exemplary embodiments relate to a compressor blade assembly structure, a gas turbine having the same, and a method of assembling compressor blade.

2. Description of the Related Art

A turbine is a mechanical device that obtains a rotational force by an impulsive force or reaction force using a flow of a compressible fluid such as steam or gas. The turbine includes a steam turbine using a steam and a gas turbine using a high temperature combustion gas.

The gas turbine includes a compressor, a combustor, and a turbine. The compressor includes an air inlet into which air is introduced, and a plurality of compressor vanes and compressor blades, which are alternately arranged in a compressor housing.

The combustor supplies fuel to the compressed air compressed in the compressor and ignites a fuel-air mixture with a burner to produce a high temperature and high pressure combustion gas.

The turbine includes a plurality of turbine vanes and turbine blades which are alternately arranged in a turbine housing. Further, a rotor is disposed passing through center of the compressor, the combustor, the turbine and an exhaust chamber.

The rotor is rotatably supported at both ends thereof by bearings. A plurality of disks are fixed to the rotor and the plurality of blades are coupled to corresponding disks, respectively. A driving shaft of a generator is connected to an end of the rotor that is adjacent to the exhaust chamber.

The gas turbine does not have a reciprocating mechanism such as a piston which is usually provided in a four-stroke engine. That is, the gas turbine has no mutual frictional parts such as piston-cylinder, thereby having advantages in that consumption of lubricant is extremely small, an amplitude of vibration as a characteristic of a reciprocating machine is greatly reduced, and high speed operation is possible.

Briefly describing the operation of the gas turbine, the compressed air compressed by the compressor is mixed with fuel and combusted to produce a high-temperature combustion gas, which is then injected toward the turbine. The injected combustion gas passes through the turbine vanes and the turbine blades to generate a rotational force by which the rotor is rotated.

In a related art, the compressor blade is fastened by inserting the dovetail part of the compressor blade into the slot of the compressor rotor disk and performing punching outside the slot to cause plastic deformation.

However, in this case, there is a problem that the protruding part around the punching part must be removed by grinding. Further, when disassembling and reassembling the compressor blade, the number of plastically deformed parts increases, which makes the operation difficult, and the increase in punched parts may cause cracks in the compressor rotor disk.

The foregoing is intended merely to aid in the understanding of the background of the present disclosure, and is not intended to mean that the present disclosure falls within the purview of the related art that is already known to those skilled in the art.

SUMMARY

Aspects of one or more exemplary embodiments provide a compressor blade assembly structure in which a compressor blade can be very easily assembled onto the compressor rotor disk and reusable without damage of any component, a gas turbine having the same, and a method of assembling a compressor blade.

Additional aspects will be set forth in part in the description which follows and, in part, will become apparent from the description, or may be learned by practice of the exemplary embodiments.

According to an aspect of an exemplary embodiment, there is provided a compressor blade assembly structure including: a compressor blade having an airfoil, a platform part, and a dovetail part; a compressor rotor disk having a dovetail slot into which the dovetail part is inserted; and a locking key mounted in a key slot formed in the dovetail slot to support the compressor blade in an axial direction.

The locking key may include a main body formed elongated in the axial direction, a protrusion formed in a center of a lower surface of the main body, and a pair of ribs formed on both sides of an upper surface of the main body.

The main body may be formed of an elastically deformable rectangular plate.

The key slot may be formed on a bottom of the dovetail slot to accommodate the main body, wherein the key slot includes an insertion groove into which the protrusion is inserted, and an accommodation groove for accommodating one end of the elastically deformed locking key.

The dovetail part of the compressor blade may include a pair of key grooves on both sides in the axial direction to accommodate the pair of ribs.

The locking key may be mounted in the key slot and elastically deformed on one side so that the dovetail part of the compressor blade is inserted into the dovetail slot of the compressor rotor disk to support the compressor blade from moving in the axial direction.

The protrusion of the locking key may be formed in a position slightly inclined from the center to one side on the lower surface of the main body, and the insertion groove may be formed in a position slightly inclined to one side on a bottom of the key slot in the axial direction.

The accommodation groove may be formed slightly deeper than the insertion groove.

According to an aspect of another exemplary embodiment, there is provided a gas turbine including: a compressor configured to compress external air; a combustor configured to mix fuel with compressed air compressed by the compressor to combust an air-fuel mixture; and a turbine having a turbine blade mounted on a turbine rotor disk and configured to be rotated by the combustion gas discharged from the combustor, wherein the compressor includes: a compressor blade having an airfoil, a platform part, and a dovetail part;

a compressor rotor disk having a dovetail slot into which the dovetail part is inserted; and a locking key mounted in a key slot formed in the dovetail slot to support the compressor blade in an axial direction.

The locking key may include a main body formed elongated in the axial direction, a protrusion formed in a center of a lower surface of the main body, and a pair of ribs formed on both sides of an upper surface of the main body.

The main body may be formed of an elastically deformable rectangular plate.

The key slot may be formed on a bottom of the dovetail slot to accommodate the main body, wherein the key slot includes an insertion groove into which the protrusion is inserted, and an accommodation groove for accommodating one end of the elastically deformed locking key.

The dovetail part of the compressor blade may include a pair of key grooves on both sides in the axial direction to accommodate the pair of ribs.

The locking key may be mounted in the key slot and elastically deformed on one side so that the dovetail part of the compressor blade is inserted into the dovetail slot of the compressor rotor disk to support the compressor blade from moving in the axial direction.

The protrusion of the locking key may be formed in a position slightly inclined from the center to one side on the lower surface of the main body, and the insertion groove may be formed in a position slightly inclined to one side on a bottom of the key slot in the axial direction.

The accommodation groove may be formed slightly deeper than the insertion groove.

According to an aspect of another exemplary embodiment, there is provided a method of assembling a compressor blade including: mounting a locking key in a key slot formed in a dovetail slot of a compressor rotor disk; elastically deforming one side of the locking key; inserting a dovetail part of the compressor blade into the dovetail slot; and elastically restoring the elastically deformed side of the locking key to support the dovetail part in an axial direction.

The locking key may include a main body formed elongated in the axial direction, a protrusion formed in a center of a lower surface of the main body, and a pair of ribs formed on both sides of an upper surface of the main body.

The key slot may be formed on a bottom of the dovetail slot to accommodate the main body, wherein the key slot includes an insertion groove into which the protrusion is inserted, and an accommodation groove accommodating one end of the elastically deformed locking key.

The dovetail part of the compressor blade may include a pair of key grooves on both sides in the axial direction to accommodate the pair of ribs.

According to one or more exemplary embodiments, the compressor blade can be very easily assembled on the compressor rotor disk and reusable without damaging any component.

BRIEF DESCRIPTION OF THE DRAWINGS

The above and other aspects will become more apparent from the following description of the exemplary embodiments with reference to the accompanying drawings, in which.

DETAILED DESCRIPTION

Various modifications and various embodiments will be described in detail with reference to the accompanying drawings so that those skilled in the art can easily carry out the disclosure. However, it should be noted that the various embodiments are not for limiting the scope of the disclosure to the specific embodiment, but they should be interpreted to include all modifications, equivalents or substitutions of the embodiments included within the spirit and scope disclosed herein.

Terms used herein are for the purpose of describing specific embodiments only and are not intended to limit the scope of the disclosure. As used herein, an element expressed as a singular form includes a plurality of elements, unless the context clearly indicates otherwise. Further, terms such as "comprising" or "including" should be construed as designating that there are such features, numbers, steps, operations, elements, parts, or combinations thereof, not to exclude the presence or addition of one or more other features, numbers, steps, operations, elements, parts, or combinations thereof.

Hereinafter, exemplary embodiments will be described in detail with reference to the accompanying drawings. It is noted that like reference numerals refer to like parts throughout the different drawings and exemplary embodiments. In certain embodiments, a detailed description of known functions and configurations well known in the art will be omitted to avoid obscuring appreciation of the disclosure by a person of ordinary skill in the art. For the same reason, some elements are exaggerated, omitted, or schematically illustrated in the accompanying drawings.

Figure 1:
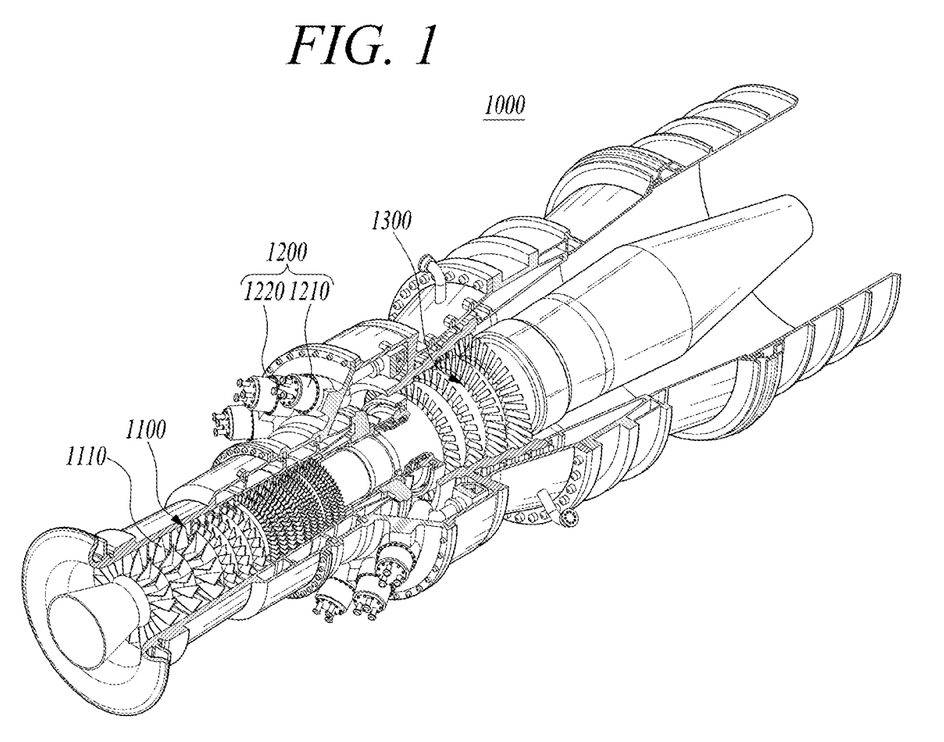
FIG. 1 is a partially cut-away perspective view of a gas turbine according to an exemplary embodiment.
Figure 2:
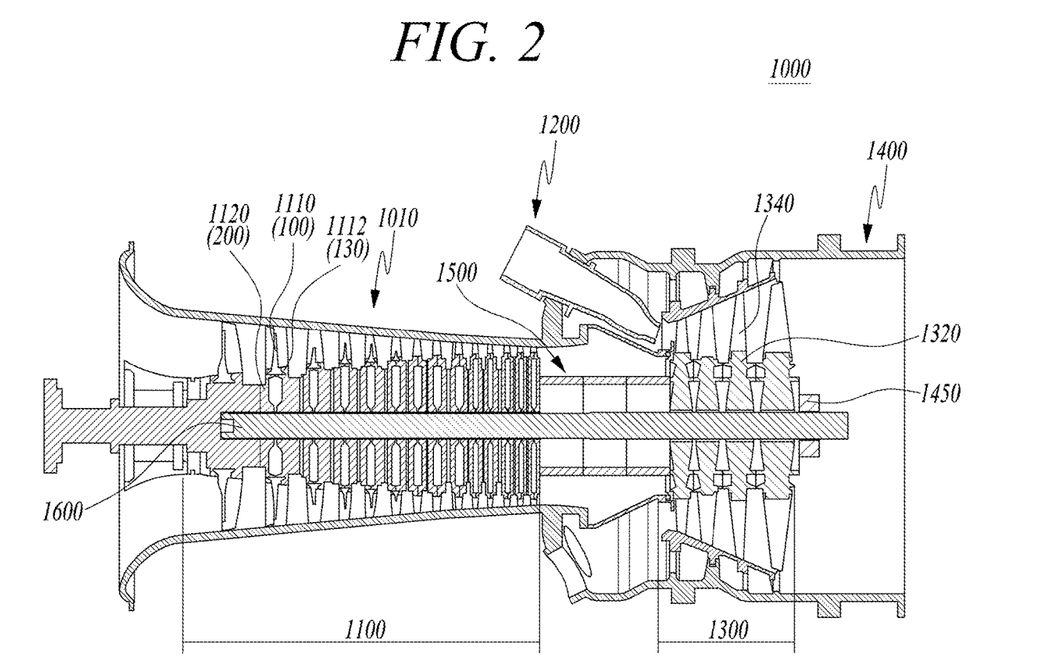
FIG. 2 is a cross-sectional view illustrating a schematic structure of a gas turbine according to an exemplary embodiment.
Figure 3:
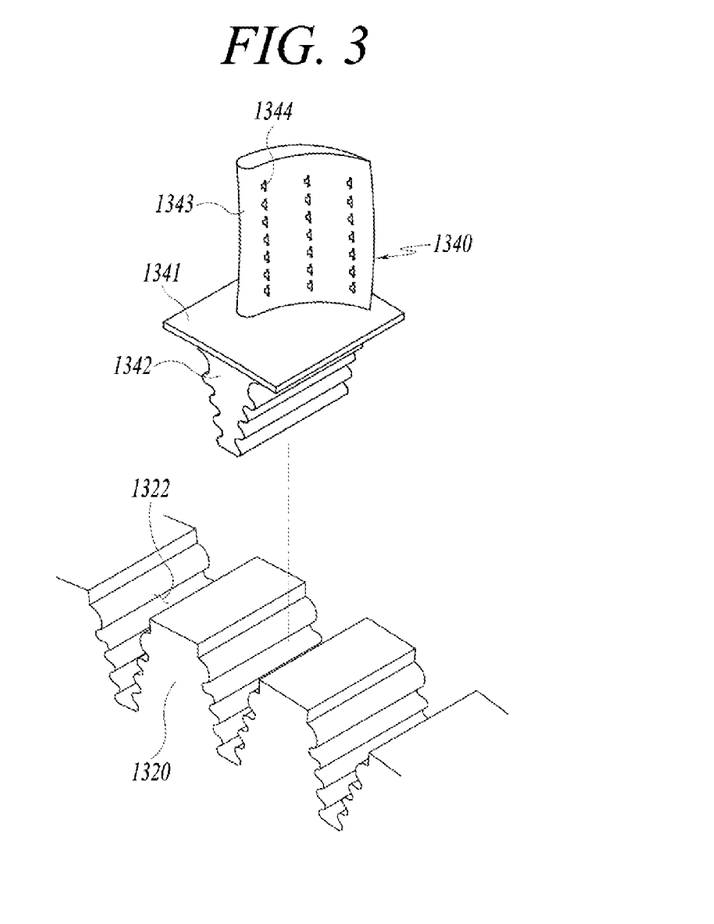
FIG. 3 is an exploded perspective view illustrating a turbine rotor disk of FIG. 2.

FIG. 1 is a partially cut-away perspective view of a gas turbine according to an exemplary embodiment, FIG. 2 is a cross-sectional view illustrating a schematic structure of a gas turbine according to an exemplary embodiment, and FIG. 3 is an exploded perspective view illustrating a turbine rotor disk of FIG. 2.

Referring to FIG. 1, a gas turbine 1000 according to an exemplary embodiment includes a compressor 1100, a combustor 1200, and a turbine 1300. The compressor 1100 includes a plurality of blades 1110 radially installed. The compressor 1100 rotates the plurality of blades 1110, and air is compressed and flows by the rotation of the plurality of blades 1110. A size and installation angle of each of the plurality of blades 1110 may vary depending on an installation location. The compressor 1100 may be connected directly or indirectly to the turbine 1300, and receive a portion of the power generated by the turbine 1300 to rotate the plurality of blades 1110.

Air compressed by the compressor 1100 flows to the combustor 1200. The combustor 1200 includes a plurality of combustion chambers 1210 and a fuel nozzle module 1220 arranged in an annular shape.

Referring to FIG. 2, the gas turbine 1000 includes a housing 1010 and a diffuser 1400 which is disposed on a rear side of the housing 1010 to discharge a combustion gas passing through the turbine. The combustor 1200 is disposed in front of the diffuser 1400 to compressed air supplied thereto.

Based on a flow direction of air, the compressor 1100 is located at an upstream side of the housing 1010, and the turbine 1300 is located at a downstream side of the housing. A torque tube unit 1500 is disposed as a torque transmission member between the compressor 1100 and the turbine 1300 to transmit the rotational torque generated in the turbine 1300 to the compressor 1100.

The compressor 1100 includes a plurality of compressor rotor disks 1120, each of which is fastened by a tie rod 1600 to prevent axial separation thereof.

For example, the compressor rotor disks 1120 are axially arranged in such a way that the tie rod 1600 constituting a rotary shaft passes through central portion thereof. Here, adjacent compressor rotor disks 1120 are disposed so that facing surfaces thereof are in tight contact with each other by the tie rod 1600. The adjacent compressor rotor disks 1120 cannot rotate relative to each other because of this arrangement.

A plurality of blades 1110 are radially coupled to an outer circumferential surface of the compressor rotor disk 1120. Each of the plurality of blades 1110 has a dovetail part 1112 which is fastened to the compressor rotor disk 1120.

A plurality of compressor vanes are fixedly arranged between each of the compressor rotor disks 1120. While the compressor rotor disks 1120 rotate along with a rotation of the tie rod 1600, the compressor vanes fixed to the housing 1010 do not rotate. The compressor vane guides a flow of compressed air moved from front-stage compressor blade 1110 of the compressor rotor disk 1120 to rear-stage compressor blade 1110 of the compressor rotor disk 1120.

The dovetail part 1112 may be fastened in a tangential type or an axial type, which may be selected according to the structure required for the gas turbine used. This type may have a dovetail shape or fir-tree shape. In some cases, the compressor blades 1110 may be fastened to the compressor rotor disk 1120 by using other types of fasteners such as keys or bolts.

The tie rod 1600 is arranged to pass through the center of the compressor rotor disks 1120 and turbine rotor disks 1320 such that one end thereof is fastened to the compressor rotor disk that is disposed at the most upstream side and the other end thereof is fastened by a fixing nut 1450. The tie rod 1600 may be a single tie rod or consist of a plurality of tie rods.

It is understood that the tie rod 1600 may have various shapes depending on the structure of the gas turbine, and is not limited to example shown in FIG. 2. For example, one tie rod may be disposed to pass through central portions of the rotor disks, a plurality of tie rods may be arranged circumferentially, or a combination thereof may be used.

Also, a deswirler serving as a guide vane may be installed at the rear stage of the diffuser in order to adjust a flow angle of a pressurized fluid entering a combustor inlet to a designed flow angle.

The combustor 1200 mixes the introduced compressed air with fuel, combusts the air-fuel mixture to produce a high-temperature and high-pressure combustion gas, and increases the temperature of the combustion gas to the heat resistance limit that the combustor and the turbine components can withstand through an isobaric combustion process.

A plurality of combustors constituting the combustor 1200 may be arranged in the housing in a form of a cell. Each of the combustors includes a burner having a fuel injection nozzle and the like, a combustor liner forming a combustion chamber, and a transition piece as a connection between the combustor and the turbine.

The combustor liner provides a combustion space in which the fuel injected by the fuel injection nozzle is mixed with the compressed air supplied from the compressor and the fuel-air mixture is combusted. The combustor liner may include a flame canister providing a combustion space in which the fuel-air mixture is combusted, and a flow sleeve forming an annular space surrounding the flame canister. The fuel injection nozzle is coupled to a front end of the combustor liner, and an igniter plug is coupled to a side wall of the combustor liner.

The transition piece is connected to a rear end of the combustor liner to transmit the combustion gas combusted by the igniter plug to the turbine. An outer wall of the transition piece is cooled by the compressed air supplied from the compressor to prevent the transition piece from being damaged by the high temperature combustion gas.

To this end, the transition piece is provided with cooling holes through which compressed air is injected into and cools inside of the transition piece and flows towards the combustor liner.

The compressed air that has cooled the transition piece flows into the annular space of the combustor liner and is supplied as a cooling air to an outer wall of the combustor liner from the outside of the flow sleeve through cooling holes provided in the flow sleeve so that air flows may collide with each other.

The high-temperature and high-pressure combustion gas ejected from the combustor is supplied to the turbine 1300. The supplied high-temperature and high-pressure combustion gas expands and collides with and provides a reaction force to rotating blades of the turbine to generate a rotational torque. A portion of the rotational torque is transmitted to the compressor through the torque tube, and remaining portion which is an excessive torque is used to drive a generator or the like.

The turbine 1300 is basically similar in structure to the compressor. That is, the turbine 1300 also includes a plurality of turbine rotor disks 1320 similar to the compressor rotor disks of the compressor. Thus, the turbine rotor disk 1320 also includes a plurality of turbine blades 1340 disposed radially. The turbine blade 1340 may also be coupled to the turbine rotor disk 1320 in a dovetail coupling manner. Between the turbine blades 1340 of the turbine rotor disk 1320, a plurality of turbine vanes 1330 fixed to the housing are provided to guide a flow direction of the combustion gas passing through the turbine blades 1340.

Referring to FIG. 3, the turbine rotor disk 1320 has a substantially disk shape, and includes a plurality of coupling slots 1322 formed in an outer circumferential portion thereof. Each of the coupling slot 1322 has a fir-tree-shaped curved surface.

Each of the turbine blades 1340 is fastened to an associated one of the coupling slots 1322 and includes a planar platform part 1341 formed in an approximately center thereof. The platform part 1341 has a side surface which comes into contact with a side surface of the platform part 1341 of an adjacent turbine blade to maintain a gap between the adjacent blades.

A root part 1342 is formed on the bottom surface of the platform part 1341. The root part 1342 has an axial-type shape so that the root part 1342 is inserted along an axial direction of the turbine rotor disk 1320 into the coupling slot 1332 of the turbine rotor disk 1320.

The root part 1342 has a substantially fir-tree-shaped curved surface corresponding to the fir-tree-shape curved surface of the coupling slot 1322. It is understood that the coupling structure of the root part 1342 is not limited to the fir-tree-shape, and may be formed to have a dovetail shape.

A blade part 1343 is formed on an upper surface of the platform part 1341 to have an optimized airfoil shape according to the specification of the gas turbine. Based on a flow direction of combustion gas, the blade part 1343 has a leading edge disposed at an upstream side and a trailing edge disposed at a downstream side.

The turbine blades come into direct contact with the high-temperature and high-pressure combustion gas. Because the temperature of the combustion gas has a high temperature reaching 1,700° C., the turbine requires a cooling means. For this purpose, the turbine has cooling paths through which some of the compressed air is bled from some positions of the compressor and is supplied towards the turbine blades.

The cooling path may extend outside the housing (i.e., an external path), extend through the interior of the rotor disk (i.e., an internal path), or both the external and internal paths may be used. A plurality of film cooling holes 1344 are formed on a surface of the blade part 1343. The film cooling holes 1344 communicate with a cooling path formed inside the blade part 1343 so as to supply cooling air to the surface of the blade part 1343.

The blade part 1343 of the turbine is rotated by combustion gas in the housing, and a gap exists between an end of the blade part 1343 and the inner surface of the housing so that the blade part can rotate smoothly. However, because the combustion gas may leak through the gap, a sealing means is required to prevent the leakage.

Each of the turbine vane and the turbine blade having airfoil shape includes a leading edge, a trailing edge, a suction surface, and a pressure surface. The turbine vane and turbine blade have a complex path structure forming a cooling system. A cooling circuit in the turbine vane and turbine blade receives cooling fluid, e.g., air from the compressor and the fluid passes through the ends of the turbine vane and turbine blade. The cooling circuit includes a plurality of flow paths designed to maintain temperatures of all sides of the turbine vane and blade constant. At least a portion of the fluid passing through the cooling circuits is discharged through holes of the leading edge, the trailing edge, and the suction surface, and the pressure surface.

Figure 4:
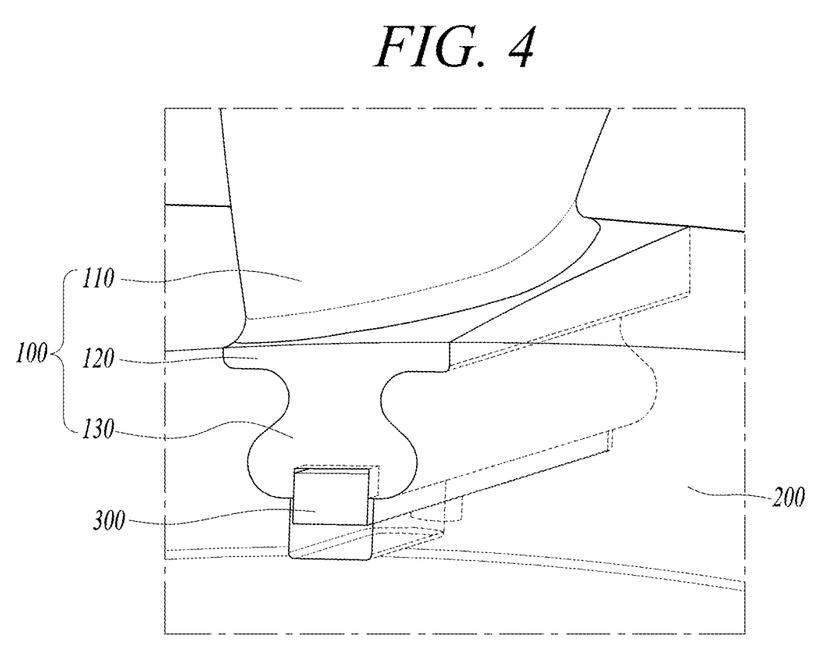
FIG. 4 is a partial perspective view illustrating an assembly structure of a compressor blade according to an exemplary embodiment.
Figure 5:
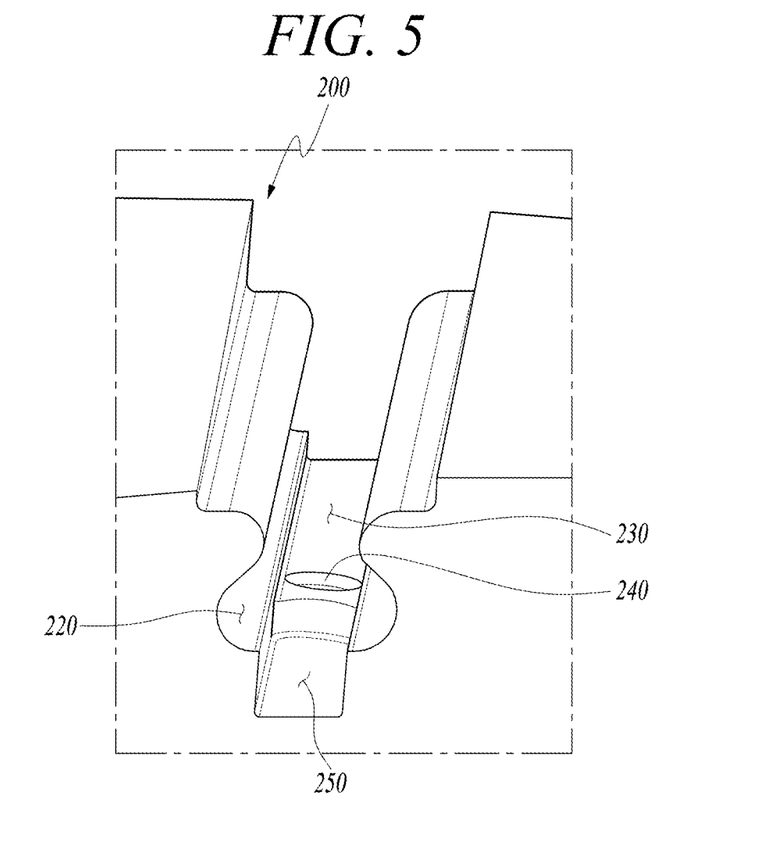
FIG. 5 is a partial perspective view illustrating a compressor rotor disk according to an exemplary embodiment.
Figure 6:
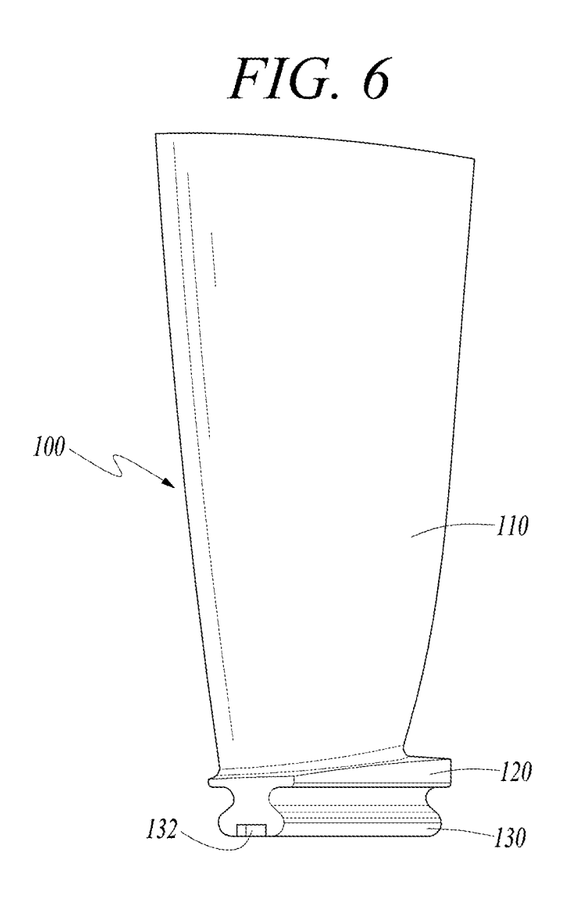
FIG. 6 is a perspective view illustrating a compressor blade according to an exemplary embodiment.
Figure 7A:
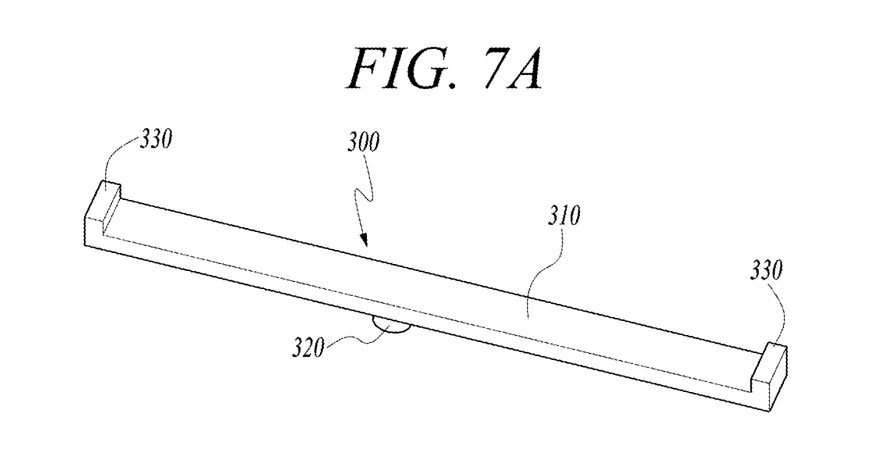
FIGS. 7A and 7B are top and bottom perspective views illustrating a locking key according to an exemplary embodiment.
Figure 7B:
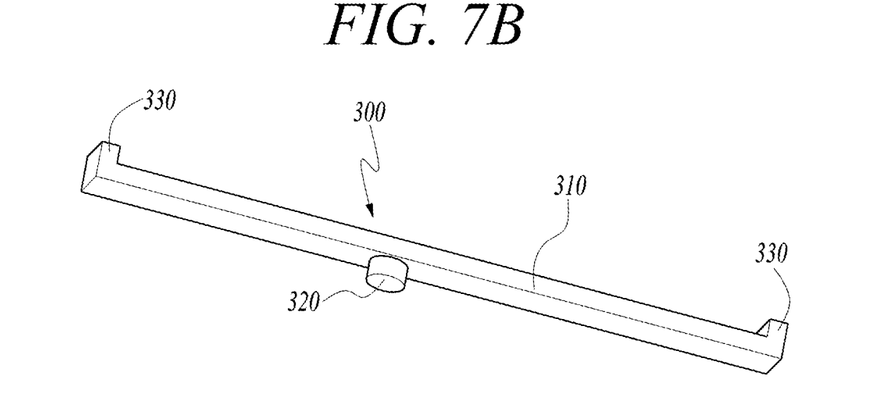

FIG. 4 is a partial perspective view illustrating an assembly structure of a compressor blade according to an exemplary embodiment, FIG. 5 is a partial perspective view illustrating a compressor rotor disk according to an exemplary embodiment, FIG. 6 is a perspective view illustrating a compressor blade according to an exemplary embodiment, and FIGS. 7A and 7B are top and bottom perspective views illustrating a locking key according to an exemplary embodiment.

Referring to FIGS. 4 and 5, an assembly structure of the compressor blade according to an exemplary embodiment includes a compressor blade 100 having an airfoil 110, a platform part 120, and a dovetail part 130, a compressor rotor disk 200 having a dovetail slot 220 into which the dovetail part 130 is inserted, and a locking key 300 fitted into a key slot 230 formed in the dovetail slot 220 to support the compressor blade in the axial direction.

Referring to FIG. 6, the airfoil 110 of the compressor blade 100 includes a leading edge, a trailing edge, a convex suction side, and a concave pressure side.

A substantially flat platform part 120 may be integrally formed on a radially inner side of the airfoil 110. The platform part 120 may have a circumferential width greater than a thickness of the airfoil 110.

The dovetail part 130 may extend radially inward of the platform part 120 so that the dovetail part 130 is integrally formed with the platform part 120. The dovetail part 130 may have a gradually increasing streamlined width and a planar radial inner surface.

Referring to FIGS. 2 and 5, the compressor rotor disk 200 has a circular disk shape having a central through hole through which the tie rod 1600 passes, and a plurality of dovetail slots 220 are arranged at regular intervals on an outer circumferential surface thereof. The dovetail part 130 of the compressor blade 100 may be inserted and mounted in each dovetail slot 220.

The locking key 300 may be inserted and mounted in the key slot 230 formed in the dovetail slot 220 in the radial direction. The locking key 300 may support the compressor blade 100 from moving radially and axially therein.

Referring to FIGS. 7A and 7B, the locking key 300 includes a main body 310 formed elongated in the axial direction, a protrusion 320 formed in a center of a lower surface of the main body 310, and a pair of ribs 330 formed on both sides of an upper surface of the main body 310.

The main body 310 may be formed of a rectangular plate that can be elastically deformable. The main body 310 may be formed in a rectangular shape having a relatively long length and a small width. The main body 310 may be formed thin as a whole so as to be elastically deformed in a thickness direction.

The protrusion 320 may protrude downward from the central portion of the lower surface of the main body 310. Although the protrusion 320 is illustrated in a cylindrical shape in FIGS. 7A and 7B, it is not limited thereto, and may be formed in a shape such as a square column, a hexagonal column, or the like. The protrusion 320 may be formed in a position slightly inclined toward one side rather than the center of the lower surface of the main body 310.

The pair of ribs 330 may be formed to protrude upward on both ends of the upper surface of the main body 310. The pair of ribs 330 may be formed in a rectangular column shape.

As illustrated in FIG. 5, the key slot 230 may be formed on the bottom of the dovetail slot 220 to accommodate the main body 310 of the locking key 300. The bottom of the dovetail slot 220 refers to an inner surface in the radial direction. Because the main body 310 of the locking key 300 is formed in an elongated rectangular parallelepiped shape, the key slot 230 may also be formed in an elongated rectangular parallelepiped groove shape in the axial direction.

The key slot 230 may include an insertion groove 240 into which the protrusion 320 of the locking key 300 is inserted, and an accommodation groove 250 that accommodates one end of the locking key 300 that is elastically deformed.

The insertion groove 240 may be formed in a cylindrical groove shape on the bottom surface of the key slot 230. Because the protrusion 320 of the locking key 300 is formed in a position slightly inclined from the center to one side on the lower surface of the main body 310, the insertion groove 240 may also be formed in a position inclined slightly toward one side on the bottom of the key slot 230 in the axial direction.

The accommodation groove 250 may be formed slightly deeper than the insertion groove 240 on one side of the insertion groove 240 on the bottom surface of the key slot 230. The accommodation groove 250 provides a space in which the portion of the locking key 300 above the accommodation groove 250 can be elastically deformed when the locking key 300 is mounted in the key slot 230.

As illustrated in FIG. 6, the dovetail part 130 of the compressor blade 100 may include a pair of key grooves 132 accommodating the pair of ribs 330 on both sides in the axial direction.

The pair of key grooves 132 may be formed in a shape of a rectangular parallelepiped groove at corners between both axial sides and lower surfaces of the dovetail part 130 to accommodate the ribs 330. The dovetail part 130 may be fixed so as not to move in both axial directions by the pair of ribs 330 inserted into the pair of key grooves 132.

The locking key 300 may be mounted in the key slot 230 and elastically deformed on one side so that the dovetail part 130 of the compressor blade 100 is inserted into the dovetail slot 220 of the compressor rotor disk 200, thereby supporting the compressor blade 100 so as not to move in the axial direction. Thus, the dovetail part 130 of the compressor blade 100 can be fixed by the locking key 300 such that the dovetail part 130 is not separated from the dovetail slot 220.

Figure 10:
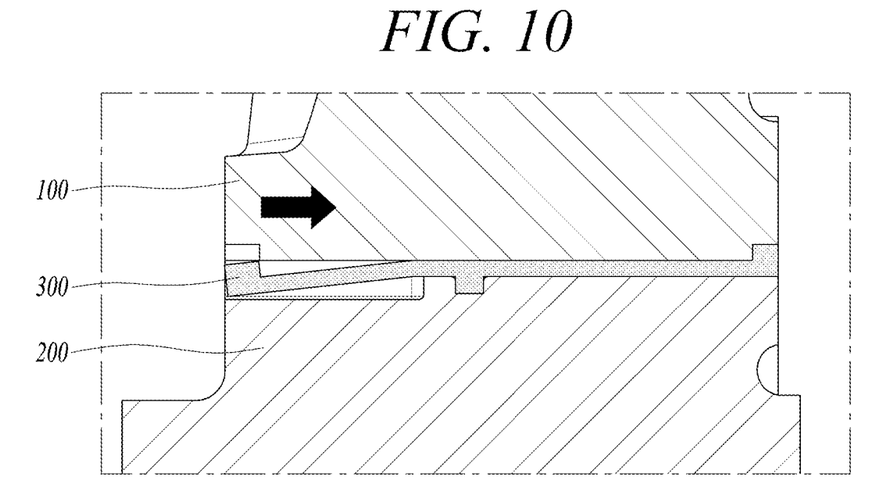
Figure 11:
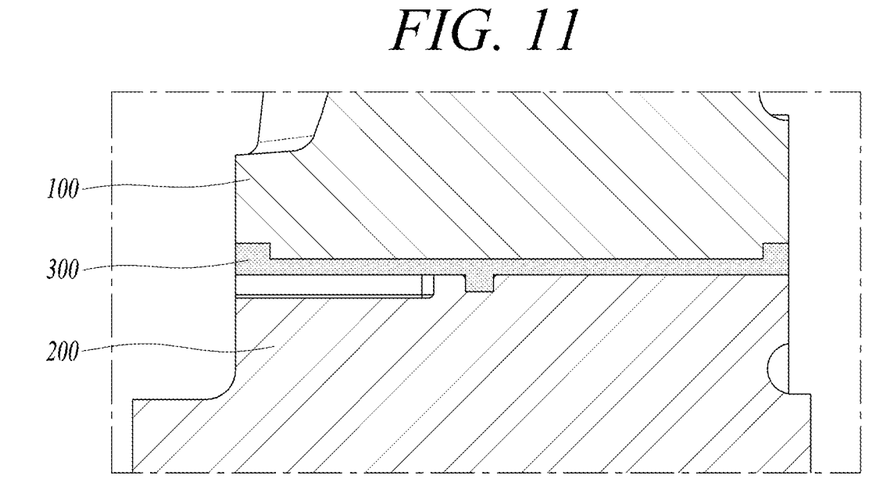
Figure 12:
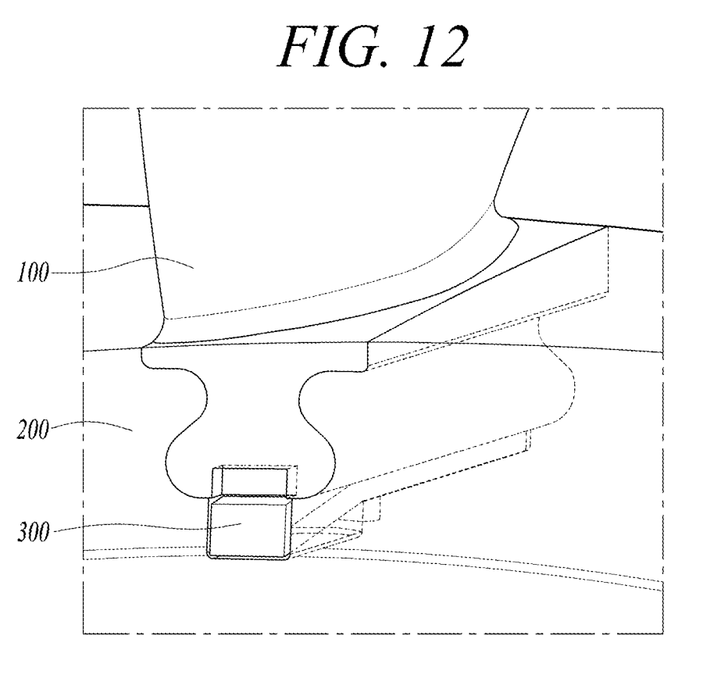
FIG. 12 is a partial perspective view illustrating a state in which the locking key is elastically deformed and a compressor blade is inserted.
Figure 13:
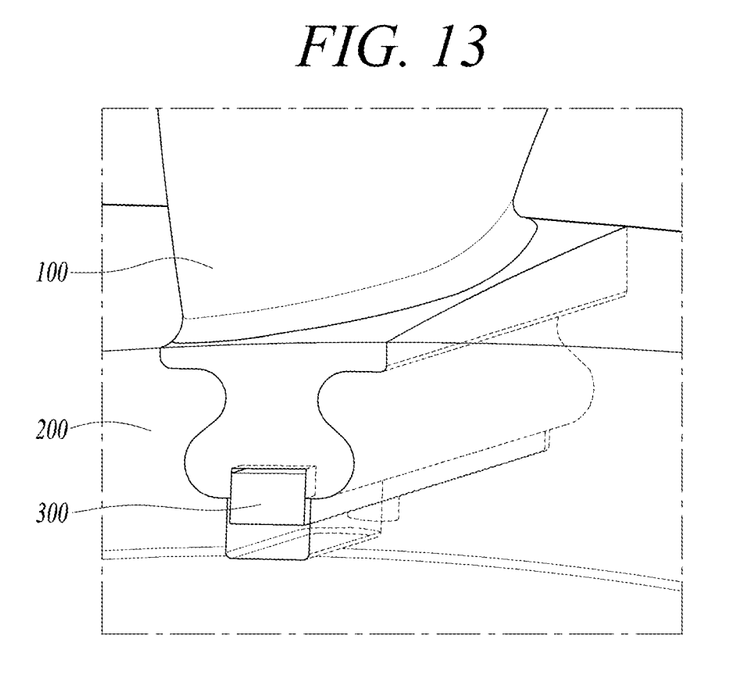
FIG. 13 is a partial perspective view illustrating a state in which a compressor blade is assembled into a compressor rotor disk by a locking key.

FIGS. 8 to 11 are partial cross-sectional views illustrating a process of assembling a compressor blade according to an exemplary embodiment, FIG. 12 is a partial perspective view illustrating a state in which the locking key is elastically deformed and a compressor blade is inserted, and FIG. 13 is a partial perspective view illustrating a state in which a compressor blade is assembled into a compressor rotor disk by a locking key.

Hereinafter, a method of assembling a compressor blade according to an exemplary embodiment will be described with reference to the accompanying drawings.

Figure 8:
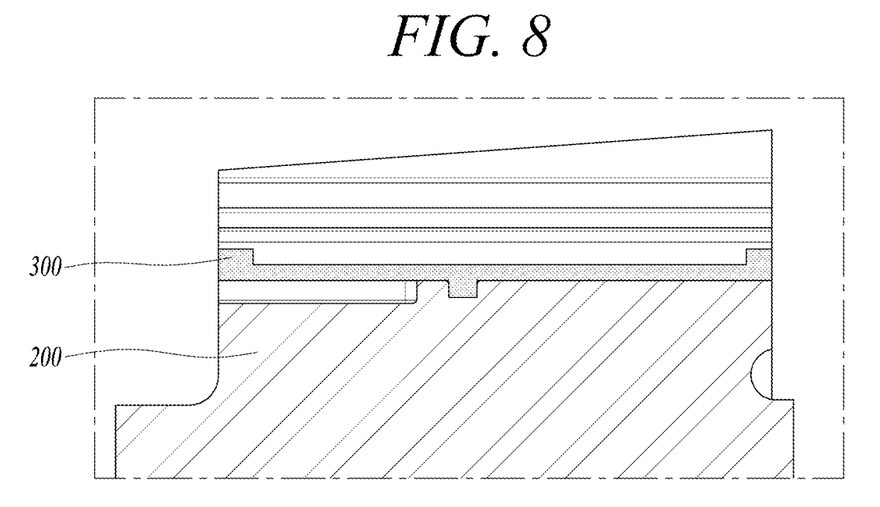
FIGS. 8 to 11 are partial cross-sectional views illustrating a process of assembling a compressor blade according to an exemplary embodiment.

Referring to FIG. 8, the locking key 300 is mounted in the key slot 230 formed in the dovetail slot 220 of the compressor rotor disk 200. At this time, the protrusion 320 of the locking key 300 may be inserted into the insertion groove 240.

Figure 9:
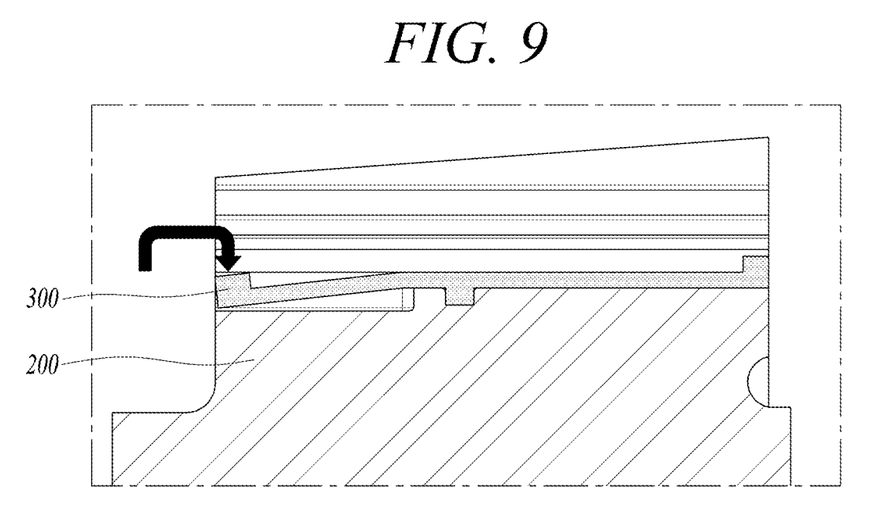

Referring to FIG. 9, one side of the locking key 300 is pressed and elastically deformed. One side of the elastically deformed locking key 300 enters the accommodation groove 250, and the top of the contour of the rib 330 may be positioned below the top surface of the key slot 230.

Referring to FIGS. 10 and 12, the dovetail part 130 of the compressor blade 100 may be inserted into the dovetail slot 220 in a state in which one side of the locking key 300 is pressed.

Referring to FIGS. 11 and 13, when one side of the pressed locking key 300 is released and elastically restored, one rib 330 of the locking key 300 is also inserted into the key groove 132 of the dovetail part 130. Thus, the locking key 300 can fixedly support the dovetail part 130 so as not to move in the axial direction.

According to one or more exemplary embodiments, the compressor blade can be very easily assembled on the compressor rotor disk and reusable without damaging any component.

While the one or more exemplary embodiments have been described with reference to the accompanying drawings, it will be apparent to those skilled in the art that various modifications and variations in form and details can be made therein without departing from the spirit and scope as defined by the appended claims. Accordingly, the description of the exemplary embodiments should be construed in a descriptive sense only and not to limit the scope of the claims, and many alternatives, modifications, and variations will be apparent to those skilled in the art.

What is claimed is:

1. A compressor blade assembly structure comprising:
   a compressor blade having an airfoil, a platform part, and a dovetail part;
   a compressor rotor disk having a dovetail slot into which the dovetail part is inserted; and
   a locking key mounted in a key slot formed in the dovetail slot to support the compressor blade in an axial direction,
   wherein the locking key comprises a main body formed elongated in the axial direction, a protrusion formed in a center of a lower surface of the body, and a pair of ribs formed on both sides of an upper surface main body,
   wherein the main body is formed of an elastically deformable rectangular plate,
   wherein the key slot is formed on a bottom of the dovetail slot to accommodate the main body, wherein the key slot includes an insertion groove into which the protrusion is inserted and an accommodation groove formed slightly deeper than the insertion groove for accommodating one end of the locking key which is the elastically deformed.

2. The compressor blade assembly structure according to claim 1, wherein the dovetail part of the compressor blade includes a pair of key grooves on both sides in the axial direction to accommodate the pair of ribs.

3. The compressor blade assembly structure according to claim 2, wherein the locking key is mounted in the key slot and elastically deformed on one side so that the dovetail part of the compressor blade is inserted into the dovetail slot of the compressor rotor disk to support the compressor blade from moving in the axial direction.

4. The compressor blade assembly structure according to claim 1, wherein the protrusion of the locking key is formed in a position slightly inclined from the center to one side on the lower surface of the main body, and the insertion groove is formed in a position slightly inclined to one side on a bottom of the key slot in the axial direction.

5. A gas turbine comprising:
   a compressor configured to compress external air;
   a combustor configured to mix fuel with air compressed by the compressor to combust an air-fuel mixture; and
   a turbine having a turbine blade mounted on a turbine rotor disk and configured to be rotated by the combustion gas discharged from the combustor,
   wherein the compressor comprises:
   a compressor blade having an airfoil, a platform part, and a dovetail part;
   a compressor rotor disk having a dovetail slot into which the dovetail part is inserted; and
   a locking key mounted in a key slot formed in the dovetail slot to support the compressor blade in an axial direction, wherein the locking key comprises a main body formed elongated in the axial direction, a protrusion formed in a center of a lower surface of the main body, and a pair of ribs formed on both sides of an upper surface of the main body, wherein the main body is formed of an elastically deformable rectangular plate, wherein the key slot is formed on a bottom of the dovetail slot to accommodate the main body, wherein the key slot includes an insert groove into which the protrusion is inserted and an accommodation groove formed slightly deeper than the insertion groove for accommodating one end of the locking key which is the elastically deformed.

6. The gas turbine according to claim 5, wherein the dovetail part of the compressor blade includes a pair of key grooves on both sides in the axial direction to accommodate the pair of ribs.

7. The gas turbine according to claim 6, wherein the locking key is mounted in the key slot and elastically deformed on one side so that the dovetail part of the compressor blade is inserted into the dovetail slot of the compressor rotor disk to support the compressor blade from moving in the axial direction.

8. The gas turbine according to claim 5, wherein the protrusion of the locking key is formed in a position slightly inclined from the center to one side on the lower surface of the main body, and the insertion groove is formed in a position slightly inclined to one side on a bottom of the key slot in the axial direction.

9. A method of assembling a compressor blade, the method comprising:
   mounting a locking key in a key slot formed in a dovetail slot of a compressor rotor disk;
   elastically deforming one side of the locking key;
   inserting a dovetail part of the compressor blade into the dovetail slot; and
   elastically restoring the elastically deformed side of the locking key to support the dovetail part in an axial direction,
   wherein the locking key comprises a main body formed elongated in the axial direction, a protrusion formed in a center of a lower surface of the main body, and a pair of ribs formed on both sides of an upper surface of the main body.

10. The method according to claim 9, wherein the key slot is formed on a bottom of the dovetail slot to accommodate the main body, wherein the key slot includes an insertion groove into which the protrusion is inserted, and an accommodation groove for accommodating one end of the locking key which is elastically deformed.

11. The method according to claim 10, wherein the dovetail part of the compressor blade includes a pair of key grooves on both sides in the axial direction to accommodate the pair of ribs.

* * * * *